(12) United States Patent
Dee

(10) Patent No.: US 8,810,960 B2
(45) Date of Patent: Aug. 19, 2014

(54) MULTI-HEAD DATA STORAGE DEVICE WITH PLURAL DATA CHANNELS PER HEAD

(75) Inventor: Richard H. Dee, Boulder, CO (US)

(73) Assignee: Oracle America, Inc., Redwood City, CA (US)

( * ) Notice: Subject to any disclaimer, the term of this patent is extended or adjusted under 35 U.S.C. 154(b) by 1602 days.

(21) Appl. No.: 10/727,804

(22) Filed: Dec. 4, 2003

(65) Prior Publication Data

US 2005/0122623 A1 Jun. 9, 2005

(51) Int. Cl.
G11B 5/29 (2006.01)
G11B 5/265 (2006.01)
G11B 5/008 (2006.01)

(52) U.S. Cl.
CPC .............. *G11B 5/0083* (2013.01); *G11B 5/29* (2013.01)
USPC ........................................ 360/121; 360/241.1

(58) Field of Classification Search
USPC ............ 360/241.1, 261.1, 261.2, 261.3, 291, 360/291.1, 291.2, 291.3, 316, 121, 240, 129
See application file for complete search history.

(56) References Cited

U.S. PATENT DOCUMENTS

| | | | | |
|---|---|---|---|---|
| 2,706,752 | A | * | 4/1955 | Dupy ............................ 360/121 |
| 3,158,374 | A | * | 11/1964 | Nickl ............................ 360/291 |
| 3,426,338 | A | * | 2/1969 | Gerding ........................ 360/121 |
| 3,614,342 | A | * | 10/1971 | Siebert ....................... 360/261.1 |
| 3,824,622 | A | * | 7/1974 | Kashimoto ................... 360/121 |
| 3,893,188 | A | * | 7/1975 | Shoemaker ................... 360/121 |
| 4,258,401 | A | * | 3/1981 | Yoshida et al. ............... 360/121 |
| 4,450,493 | A | * | 5/1984 | Watrous ..................... 360/266.5 |
| 4,539,615 | A | * | 9/1985 | Arai et al. ..................... 360/121 |
| 4,685,005 | A | * | 8/1987 | Fields, Jr. ..................... 360/121 |
| 5,008,765 | A | * | 4/1991 | Youngquist ................... 360/121 |
| 5,068,760 | A | * | 11/1991 | Kira .............................. 360/121 |
| 5,218,498 | A | * | 6/1993 | Jagielinski .................... 360/316 |
| 5,229,895 | A | * | 7/1993 | Schwarz et al. ............ 360/77.12 |
| 5,289,328 | A | * | 2/1994 | Saliba ........................... 360/121 |
| 5,293,285 | A | | 3/1994 | Leonhardt et al. ............. 360/95 |
| 5,761,005 | A | * | 6/1998 | McKay et al. ............. 360/234.6 |
| 5,831,798 | A | * | 11/1998 | Muller et al. ................. 360/121 |
| 5,850,328 | A | | 12/1998 | Leonhardt et al. ........... 360/134 |
| 5,966,276 | A | * | 10/1999 | Draaisma et al. ............ 360/121 |
| 5,995,337 | A | * | 11/1999 | Kira .............................. 360/316 |
| 6,097,570 | A | * | 8/2000 | Dee ............................... 360/121 |
| 6,101,059 | A | | 8/2000 | Wong et al. .................... 360/70 |
| 6,236,525 | B1 | * | 5/2001 | Cates et al. ................... 360/121 |
| 6,275,350 | B1 | * | 8/2001 | Barndt .......................... 360/121 |
| 6,330,123 | B1 | * | 12/2001 | Schwarz et al. ............. 360/316 |
| 6,362,934 | B1 | * | 3/2002 | Hungerford et al. ......... 360/121 |
| 6,778,359 | B1 | * | 8/2004 | Iwama .......................... 360/129 |

(Continued)

OTHER PUBLICATIONS

U.S. Appl. No. 10/394,876, Dee, Double Sided Magnetic Tape, Mar. 21, 2003.

(Continued)

*Primary Examiner* — Craig A. Renner
(74) *Attorney, Agent, or Firm* — Brooks Kushman P.C.

(57) ABSTRACT

A plurality of read/write heads is disclosed for a magnetic media storage system, such as, for example a magnetic tape drive. Each head can include a plurality of data channels. In addition to enhancing data throughput, the plurality of read/write heads can be aligned to read or write bands of tracks on a magnetic tape with only one positioning mode (e.g., without coarse position actuation and control), and also obtain optimum yield and crosstalk values.

2 Claims, 5 Drawing Sheets

(56) References Cited

U.S. PATENT DOCUMENTS

| | | | |
|---|---|---|---|
| 6,970,314 B2* | 11/2005 | Watson et al. | 360/53 |
| 2002/0097518 A1* | 7/2002 | Helms | 360/77.01 |
| 2003/0123185 A1* | 7/2003 | Denison et al. | 360/121 |
| 2003/0227702 A1 | 12/2003 | Watson et al. | |
| 2004/0141255 A1* | 7/2004 | Ogawa et al. | 360/129 |

OTHER PUBLICATIONS

U.S. Appl. No. 10/163,988, Watson et al. Multiple Section Read/Write Head for High Track Density, Flexible Media Storage Applications, Jun. 5, 2002.

* cited by examiner

MULTI-HEAD DATA STORAGE DEVICE WITH PLURAL DATA CHANNELS PER HEAD

RELATED APPLICATIONS

This Application for Patent is related by subject matter to commonly assigned U.S. Pat. Nos. 6,101,059; 5,850,328; 5,293,285; and U.S. patent application Ser. No. 10/394,876, now U.S. Pat. No. 7,068,464, filed on Mar. 21, 2003; and U.S. patent application Ser. No. 10/163,988, now U.S. Pat. No. 6,970,314, filed on Jun. 5, 2002; each of which is incorporated herein by reference.

BACKGROUND OF THE INVENTION

1. Field of the Invention

The present invention relates generally to reading and writing data in high track density, flexible media storage applications, and more specifically, but not exclusively, to a plurality of read/write heads for reading and writing data on magnetic tape.

2. Background of the Invention

A read/write head is a device that reads and writes data from and to a magnetic tape. The surface of the tape is moved past the read/write head. The data is written using a write head. The write head contains a write coil wound around a highly permeable magnetic core consisting of write poles separated by a small gap ("write gap"). When current is passed through the coil, the movement of the current produces a magnetic field turn, magnetizes the magnetic recording media as it passes the write gap. By switching the polarity of the current in the coil, data can be stored in the media as regions of opposite magnetization polarity recorded in the magnetic recording media. The regions of recorded opposite magnetization polarity correspond to stored data bits (e.g., 1's and 0's), which are detected by a read sensor as the recorded media is passed back over the read/write head. A read/write head for high track density tape typically reads or writes multiple data channels simultaneously.

FIG. 1 depicts a pictorial representation of a conventional read/write head arrangement for a magnetic tape drive. For clarity, only a pertinent section 100 of a conventional magnetic tape drive is shown. Tape drive section 100 includes a magnetic tape 102. For example, magnetic tape 102 can be wound on a supply reel (not shown) that is rotatably mounted within a magnetic tape cartridge (not shown). Thus, magnetic tape 102 can be moved by the magnetic tape drive in a horizontal direction, as indicated by the horizontally oriented arrow in FIG. 1. As shown, magnetic tape 102 includes four groups or bands of tracks 104a-104d. However, in general, conventional magnetic tapes can also include more or less than four bands.

A typical magnetic tape (e.g., 102) consists of a Mylar substrate on which has been deposited a recording surface. The recording surface consists of a layer of magnetic material. As shown in FIG. 1, the recording surface can be subdivided into a plurality of bands (e.g., 104a-104d), each band containing a plurality of data tracks.

Tape drive section 100 also includes a movable read/write head assembly 106 positioned between tape guides (not shown). Read/write head assembly 106 includes a read/write head 108, which reads and writes data from and to magnetic tape 102. For example, a coarse and fine position actuator (not shown) moves read/write head assembly 106 in a vertical direction (as indicated by the vertically oriented arrow in FIG. 1), and positions read/write head 108 over one of the bands 104a-104d for reading and writing data from and to the magnetic media in that band (e.g., 104a) on a plurality of tracks. In order to read/write data from/to all of the bands 104a-104d, the read/write head position actuator must sequentially position the read/write head 108 over each band 104a-104d. Consequently, a major drawback of the conventional read/write head assemblies is that they require both coarse and fine positioning actuators and control for each read/write band on the magnetic tape.

In conventional magnetic tape data recording systems, the read/write data rate or data throughput can be increased in a number of ways. For example, the conventional recording systems can increase the read/write data rate by increasing the speed of the tape moving past the read/write head, the linear density of the bits stored on the tape, or the number of parallel data channels placed in the head. However, these conventional solutions are limited significantly by the magnetic and physical characteristics of the storage media being used, technical obstacles in the fabrication of conventional tape drives and heads, and limits with respect to the ingenuity of the conventional designs.

Furthermore, increasing the number of parallel data channels on a recording head places a significant demand on existing head fabrication technologies. For example, increasing the number of data channels per recording head makes the head more cumbersome because of a corresponding increase in the size and stiffness of the "flex" cable involved (cable containing conductors for carrying read bias and write currents from/to the read/write head). Also, the number of data channels per recording head is limited by the stability of the storage media used, which dictates the span and number of read/write structures that can be placed side-by-side on the head. In other words, the stability of the storage media determines just how closely spaced the magnetic (read/write) structures can be on a head and still provide acceptable yield and crosstalk values.

In this regard, by requiring more space between the magnetic read/write structures on a head, the head is required to move substantially longer distances over the storage media relative to the small width or pitch of the bands, in order to reference the entire width of the media and read or write all of the data therein. As discussed above, conventional tape drives have heads that require both coarse and fine actuators for positioning control. Thus, in order to improve data throughput in magnetic media recording systems, at a minimum, these obstacles to cost-effective head design, fabrication and the ability to increase channels, tape speed and linear bit density must be overcome.

Thus, it would be advantageous to provide an improved apparatus, system and method for reading and writing data with enhanced data throughput and positioning control in magnetic media storage applications, such as, for example, in magnetic tape drives.

SUMMARY OF THE INVENTION

The present invention provides a plurality of read/write heads for magnetic media storage applications, such as, for example, a magnetic tape drive. Each head can include a plurality of data channels. In addition to enhancing data throughput, the plurality of read/write heads can be aligned to read or write bands of tracks on a magnetic tape with only one positioning mode (e.g., without coarse position actuation and control), and also obtain optimum yield and crosstalk values.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
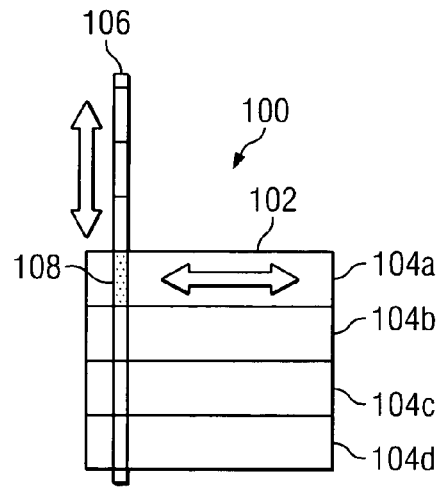
FIG. 1 depicts a pictorial representation of a conventional read/write head arrangement for a magnetic tape drive that operates with the tape subdivided into bands of tracks.
Figure 2:
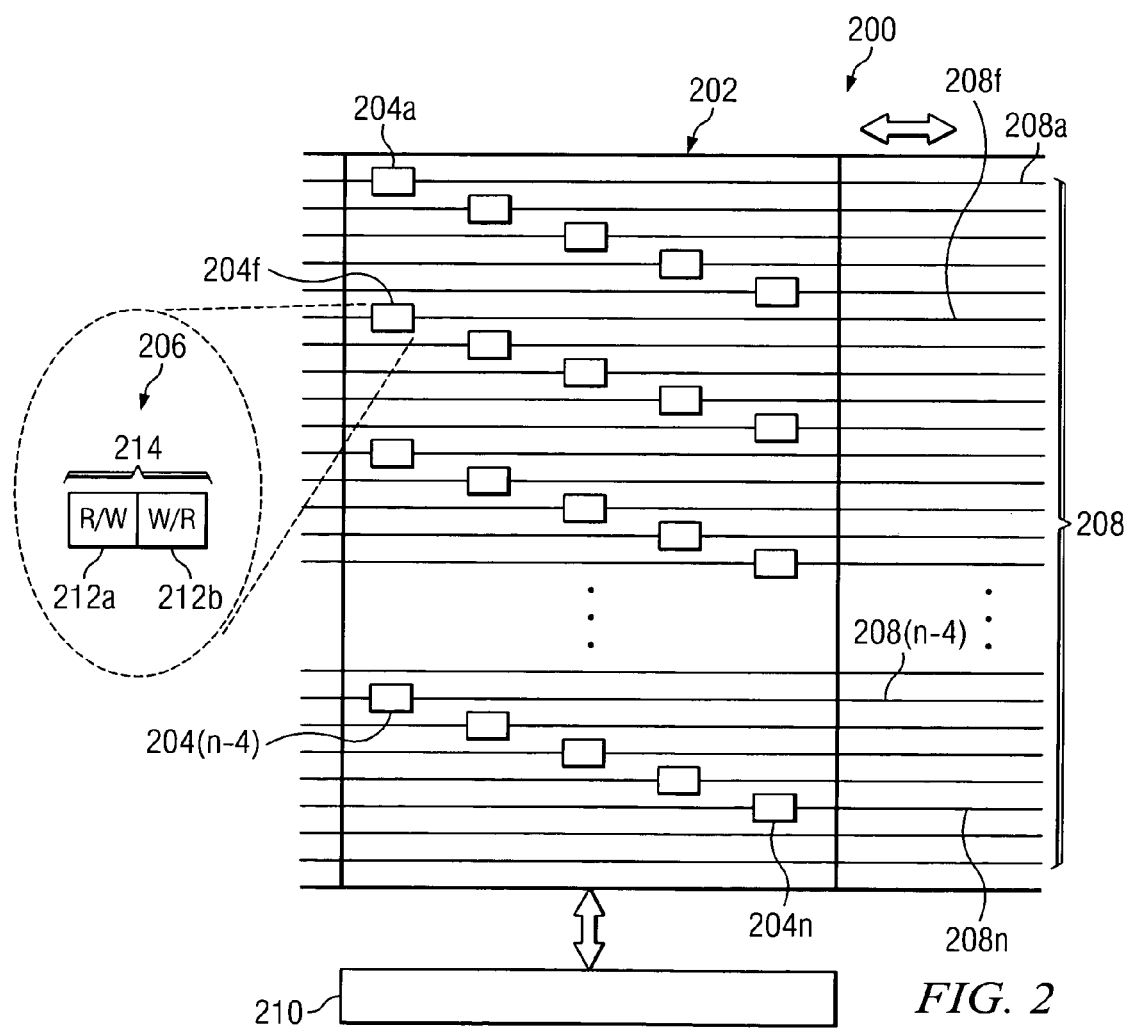
FIG. 2 depicts a pictorial representation of a read/write head assembly for magnetic storage media applications that may be used to implement a preferred embodiment of the present invention.

With reference now to the figures, FIG. 2 depicts a pictorial representation of a read/write head assembly for magnetic storage media applications that may be used to implement a preferred embodiment of the present invention. Referring to the exemplary embodiment shown in FIG. 2, a pictorial representation of a section 200 of a magnetic tape drive is shown. For clarity, only a pertinent section (200) of the magnetic tape drive is shown. In this regard, FIG. 2 is intended only as an example, and not as an architectural limitation for the present invention.

Magnetic tape drive section 200 includes a movable read/write head assembly 202 preferably positioned between tape guides (not shown). For this exemplary embodiment, read/write head assembly 202 includes a plurality of read/write heads 204a-204n, each of which head can read and write data from and to a magnetic tape 208. As such, the sub-script "n" can equal 1, 2, 3, . . . etc. and represent the total number of read/write heads included in read/write head assembly 202. For example, if the total number of read/write heads 204a-204n in read/write assembly 202 is 32 (i.e., "n"=32), then read/write head 204a can represent a "1st" read/write head, read/write head 204f can represent a "6th" read/write head, read/write head 204(n-4) can represent a "28th" read/write head, and so on in read/write head assembly 202.

Notably, in accordance with a preferred embodiment of the present invention, a plurality of position actuators (e.g., for illustrative purposes only, denoted generally as position actuator 210) can position the plurality of read/write heads 204a-204n of read/write head assembly 202 in a vertical direction (as indicated by the vertically oriented arrow in FIG. 2) so as to align each read/write head 204a-204n with a corresponding band of a plurality of bands 208a-208n included on magnetic tape 208, and thereby read and write data from and to the magnetic media in the respective band. If, as illustrated by this exemplary embodiment, the number of read/write heads 204a-204n arranged on read/write head assembly 202 equals the number of read/write bands of tracks 208a-208n arranged on magnetic tape 208, then the positioning of each read/write head 204a-204n of read/write head assembly 202 over each corresponding band 208a-208n included on magnetic tape 208 can be performed successfully with only a fine position actuator (e.g., plurality of actuators 210) for each read/write head 204a-204n. In other words, in accordance with the present invention, providing a read/write head for each read/write band on a magnetic tape obviates the conventional need for two positioning modes (both coarse and fine positioning), and also for coarse position actuators.

Also in accordance with a preferred embodiment of the present invention, a single position actuator (e.g., 210) can be used to position read/write head assembly 202 in a vertical direction (instead of a position actuator for each read/write head 204a-204n), which in turn, can align each read/write head 204a-204n with a corresponding band of a plurality of bands 208a-208n included on magnetic tape 208 in order to read and write data from and to the magnetic media in the respective band.

Also, for this exemplary embodiment, each read/write head 204a-204n can be configured to include at least one read/write element 212a and one write/read element 212b, as shown in the exploded view 206. A primary reason for configuring each read/write head 204a-204n with a read/write element 212a side-by-side with a write/read element 212b as shown, is to maintain a sequence of writing and then reading if the tape 208 is moved in either direction.

Data channels are used for transferring data between a read/write head assembly (e.g., 202) and a magnetic tape drive (e.g., 200). As described earlier, increasing the number of data channels per read/write head assembly increases the data transfer rate. For this exemplary embodiment, if "M" represents the number of data channels to be used, and "N" represents the number of read/write heads to be provided per head assembly, then "M/N" represents the number of data channels provided per read/write head. For example, if 32 data channels ("M") are to be used for transferring data between read/write head assembly 202 and magnetic tape drive 200, and 4 read/write heads 204a-204n ("N") are to be provided, then the number of data channels provided per read/write head ("M/N") is 8. Also, for this embodiment, "N" can represent the number of read/write bands of tracks 208a-208n on the magnetic tape.

Referring now to exploded view 206 in FIG. 2, for this exemplary embodiment, each read/write head 204a-204n can include at least one pair of read/write and write/read elements (e.g., 212a, 212b). For illustrative purposes only, the pair of read/write and write/read elements 212a, 212b may be associated with at least one data channel (e.g., 214). However, as demonstrated by the above-described relationship, "M/N", the number of paired read/write and write/read elements e.g., 212a, 212b) and data channels (e.g., 214) provided for each read/write head 204a-204n can be greater than 2. In this regard, the exploded view 206 in FIG. 2 is intended as an illustrative example, and not as an architectural limitation for the present invention.

FIGS. 3A-3E are related diagrams illustrating various read/write head assemblies for magnetic storage media applications that may be used to implement one or more preferred embodiments of the present invention. Referring to the exemplary embodiment shown in FIG. 3A, a pictorial representation of section 300a of a magnetic tape drive is shown. For this example, section 300a includes read/write head assembly 302a and magnetic tape 304. Magnetic tape 304 includes four bands of tracks 304a-304d. Similar to the arrangement shown in FIG. 2, each read/write head of read/write head assembly 302a can be positioned in a vertical direction, and magnetic tape 304 can be moved in a horizontal direction and in close proximity to read/write head assembly 302a.

Figure 3A:
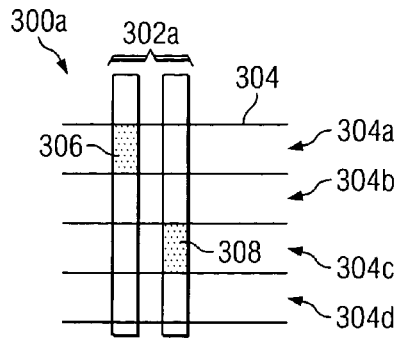
FIGS. 3A-3E are related diagrams illustrating various read/write head assemblies for magnetic storage media applications that may be used to implement one or more preferred embodiments of the present invention.

Exemplary read/write head assembly 302a includes two read/write heads 306 and 308. Although read/write head assembly 302a is shown in FIG. 3A with each read/write head 306, 308 arranged in a separate assembly structure, the structure and arrangement shown are for illustrative purposes only and not intended as an architectural limitation for the present invention. In other words, read/write head assembly 302a can be arranged as an integral structure or separate sub-structures. In any event, referring to the channels per head relationship, M/N, described above with respect to FIG. 2, in order to provide 32 data channels ("M"=32) for transferring data between read/write head assembly 302a and magnetic tape drive 300a, each read/write head 306, 308 ("N"=2) is associated with (and electronically coupled to) 16 data channels.

Figure 3B:
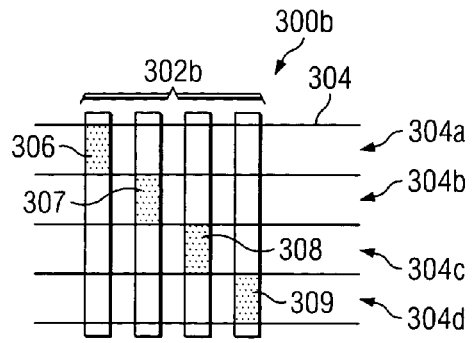

Referring now to the exemplary embodiment shown in FIG. 3B, a pictorial representation of a section 300b of a magnetic tape drive is shown. For this example, section 300b includes a read/write head assembly 302b and magnetic tape 304. Similar to the arrangement shown in FIG. 3A, magnetic tape 304 includes four bands of tracks 304a-304d. Also, each read/write head of read/write head assembly 302b can be positioned in a vertical direction, and magnetic tape 304 can be moved in a horizontal direction and in close proximity to read/write head assembly 302b.

For this example, read/write head assembly 302b includes four read/write heads 306-309. Again, although read/write head assembly 302b is shown in FIG. 3B with each read/write head 306-309 arranged in a separate assembly structure, the structure and arrangement shown are for illustrative purposes only and not intended as an architectural limitation for the present invention. In any event, referring to the channels per head relationship, M/N, described above with respect to FIG. 2, in order to provide 32 data channels ("M"=32) for transferring data between read/write head assembly 302b and magnetic tape drive 300b, each read/write head 306-309 ("N"=4) is associated with (and electronically coupled to) 8 data channels.

Figure 3C:
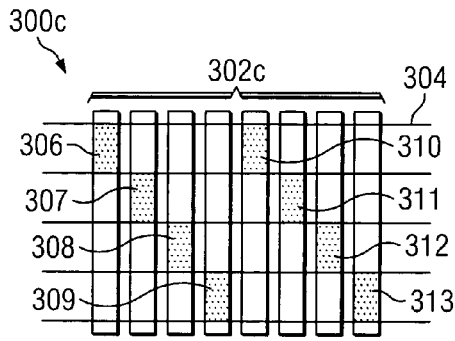

Referring now to the exemplary embodiment shown in FIG. 3C, a pictorial representation of section 300c of a magnetic tape drive is shown. For this example, section 300c includes a read/write head assembly 302c and magnetic tape 304. Similar to the arrangement shown in FIG. 3A, magnetic tape 304 also includes four bands of tracks. Also, each read/write head of read/write head assembly 302c can be positioned in a vertical direction, and magnetic tape 304 can be moved in a horizontal direction and in close proximity to read/write head assembly 302c.

For this example, read/write head assembly 302c includes eight read/write heads 306-313. Again, the structure and arrangement shown for read/write head assembly 302c are for illustrative purposes only and not intended as an architectural limitation for the present invention. Referring to the above-described channels per head relationship, M/N, in order to provide 32 data channels ("M"=32) for transferring data between read/write head assembly 302c and magnetic tape drive 300c, each read/write head 306-313 ("N"=8) is associated with (and electronically coupled to) 4 data channels.

Figure 3E:
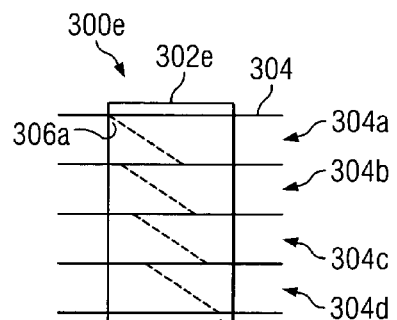
Figure 3D:
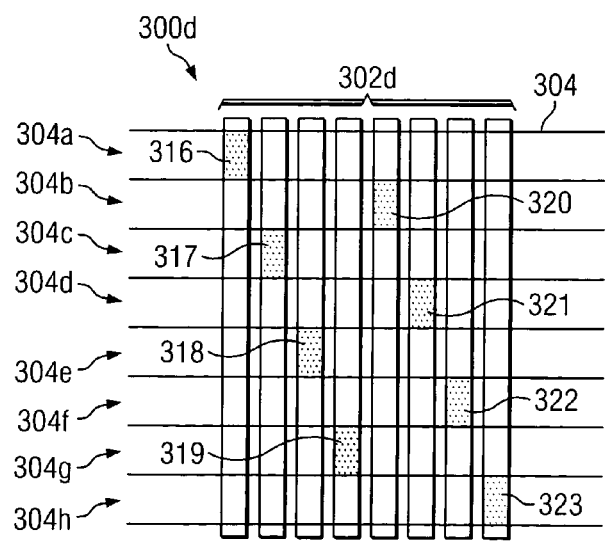

Referring now to the exemplary embodiment shown in FIG. 3D, a pictorial representation of section 300d of a magnetic tape drive is shown. For this example, section 300d includes a read/write head assembly 302d and magnetic tape 304. However, in this embodiment, magnetic tape 304 includes eight bands of tracks 304a-304h. As such, each read/write head of read/write head assembly 302d can be positioned in a vertical direction, and magnetic tape 304 can be moved in a horizontal direction and in close proximity to read/write head assembly 302d.

For this example, read/write head assembly 302d includes eight read/write heads 316-323. Again, the structure and arrangement shown for read/write head assembly 302d are for illustrative purposes only and not intended as an architectural limitation for the present invention. Referring to the above-described channels per head relationship, M/N, in order to provide 32 data channels ("M"=32) for transferring data between read/write head assembly 302d and magnetic tape drive 300d, each read/write head 316-323 ("N"=8) is associated with (and electronically coupled to) 4 data channels.

Referring now to the exemplary embodiment shown in FIG. 3E, a pictorial representation of section 300e of a magnetic tape drive is shown. For this example, section 300e includes a read/write head assembly 302e and magnetic tape 304. Similar to the exemplary structures shown in FIGS. 3A-3C, magnetic tape 304 includes four bands (e.g., 304a-304d). Also, each read/write head of read/write head assembly 302e can be positioned vertically, and magnetic tape 304 can be moved horizontally and in close proximity to assembly 302e.

However, for this exemplary embodiment, read/write head assembly 302e can include any number of read/write heads 306a-306n. As such, referring to the channels per head relationship, M/N, in order to provide 32 data channels ("M"=32) for transferring data between read/write head assembly 302e and magnetic tape drive 300e, each read/write head 306a-306n (where "N" in this case equals the generalized value of "n") is associated with and electronically coupled to 32/n data channels. Thus, for this exemplary embodiment, if the value of "n" is 32 (e.g., number of read/write heads), then one data channel can be provided for each read/write head 306a-306n.

Figure 4A:
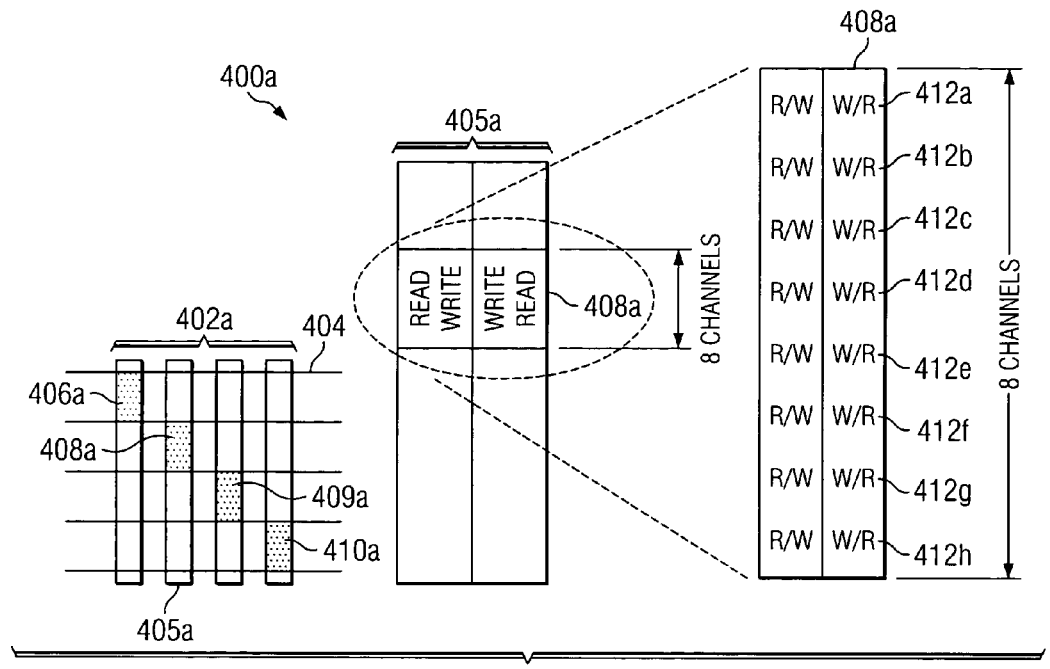
FIGS. 4A-4C are related diagrams illustrating various read/write head and data channel arrangements for magnetic storage media applications that may be used to implement one or more preferred embodiments of the present invention.
Figure 4B:
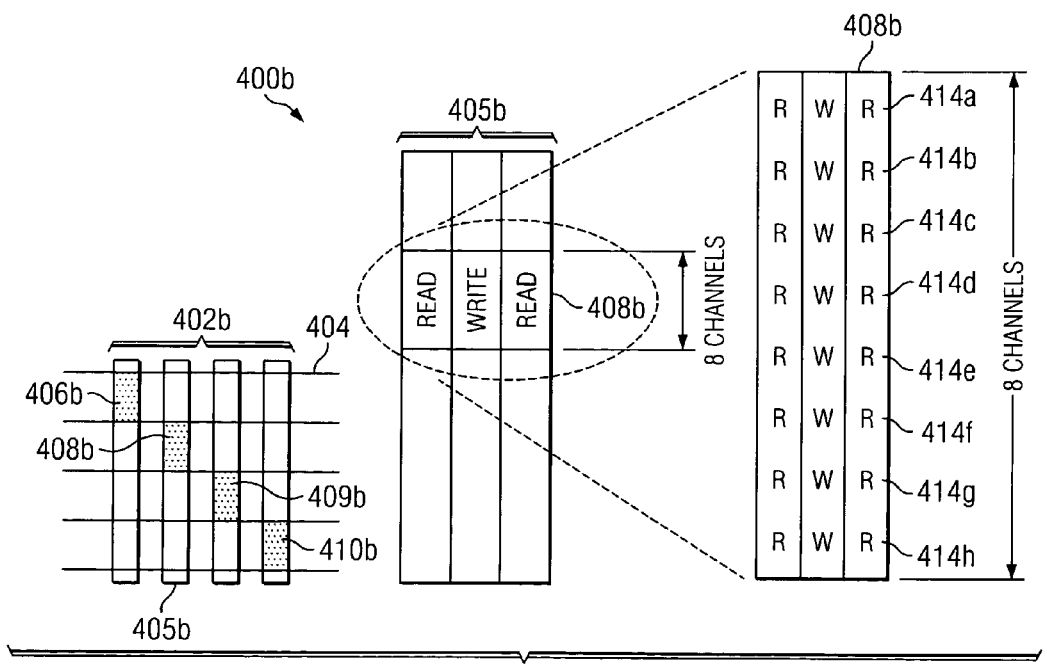
Figure 4C:
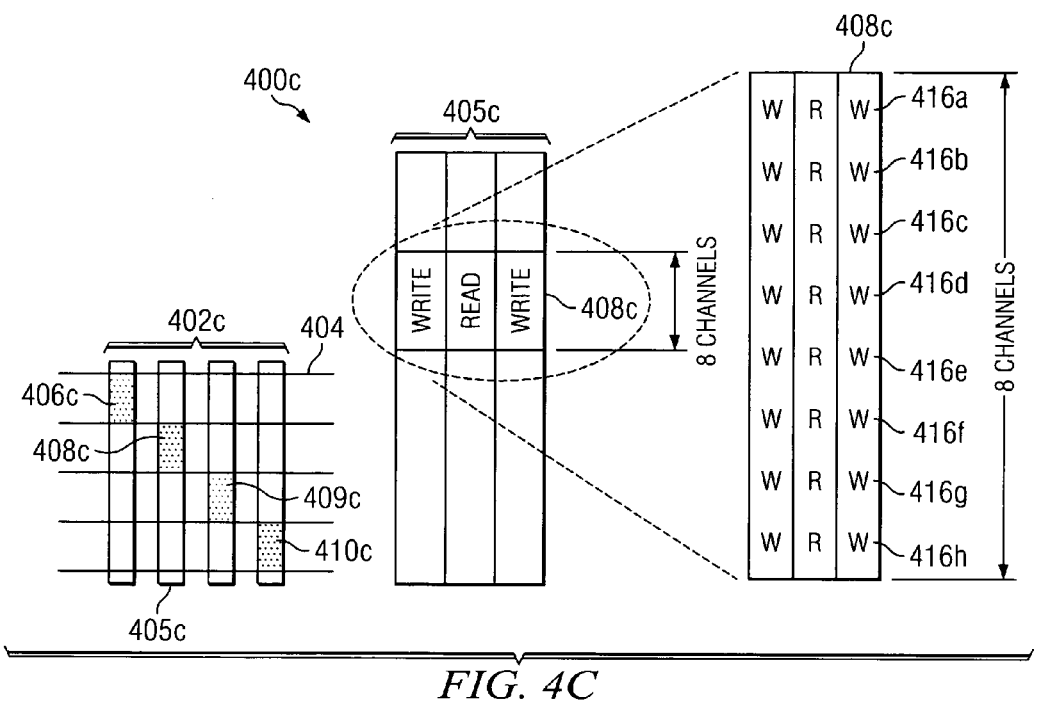

FIGS. 4A-4C are related diagrams illustrating various read/write head and data channel arrangements for magnetic storage media applications that may be used to implement one or more preferred embodiments of the present invention. Referring to the exemplary embodiment shown in FIG. 4A, a pictorial representation of a section 400a of a magnetic tape drive is shown. For this example, section 400a includes a read/write head assembly 402a and a magnetic tape 404. Magnetic tape 404 includes four bands of tracks. Similar to the arrangement shown in FIG. 2, each read/write head of read/write head assembly 402a can be positioned in a vertical direction, and magnetic tape 404 can be moved in a horizontal direction and in close proximity to read/write head assembly 402a.

Exemplary read/write head assembly 402a includes four read/write heads 406a, 408a, 409a and 410a. Although read/write head assembly 402a is shown in FIG. 4A with four read/write heads 406a, 408a, 409a, 410a arranged in a particular assembly structure, the structure and arrangement shown are for illustrative purposes only and not intended as an architectural limitation for the present invention.

Referring once again to the channels per head relationship, M/N, described above with respect to FIG. 2, in order to provide 32 data channels ("M"=32) to transfer data between read/write head assembly 402a and magnetic tape drive 400a, each of the four read/write heads 406a, 408a, 409a, 410a ("N"=4) can be associated with (and electronically coupled to) 8 data channels. As such, in accordance with the present invention, the channels per head relationship, M/N, of 8 channels per head, can be realized with the exemplary configuration of read/write head 408a of sub-assembly 405a shown in FIG. 4A.

As illustrated by the exploded view of read/write head 408a as an example, each read/write head 406a, 408a, 409a, 410a can include eight pairs of read/write and write/read elements (e.g., 412a-412h). Also, each pair of the eight read/write and write/read elements 412a-412h may be associated with (and coupled to) one data channel. Therefore, for this example, the four read/write heads 406a, 408a, 409a, 410a can be configured to provide 32 data channels for transferring data between read/write head assembly 402a and magnetic tape drive 400a.

Referring now to the exemplary embodiment shown in FIG. 4B, a pictorial representation of a section 400b of a magnetic tape drive is shown. For this example, section 400b includes a read/write head assembly 402b and a magnetic tape 404. Magnetic tape 404 includes four bands of tracks.

Exemplary read/write head assembly 402b includes four read/write heads 406b, 408b, 409b and 410b. Again, the structure and arrangement shown are for illustrative purposes only and not intended as an architectural limitation for the present invention.

Referring again to the above-described channels per head relationship, M/N, in order to provide 32 data channels ("M"=32) to transfer data between read/write head assembly 402b and magnetic tape drive 400b, each of the four read/write heads 406b, 408b, 409b, 410b ("N"=4) can be associated with (and electronically coupled to) 8 data channels. As such, in accordance with the present invention, the channels per head relationship, M/N, of 8 channels per head, can be realized with the exemplary configuration of read/write head 408b of sub-assembly 405b shown in FIG. 4B.

As illustrated by the exploded view of read/write head 408b as an example, each read/write head 406b, 408b, 409b, 410b can include eight read/write/read elements (e.g., 414a-414h). The read/write/read configuration shown may use separate read and write elements in order to verify that the data was written correctly to the data storage media. After the data is written, the data is then read for verification. This configuration is referred to as "read-after-write". In any event, each of the eight read/write/read elements 414a-414h may be associated with (and coupled to) one data channel. Therefore, for this example, the four read/write heads 406b, 408b, 409b, 410b can be configured to provide 32 data channels for transferring data between read/write head assembly 402b and magnetic tape drive 400b.

Referring to the exemplary embodiment shown in FIG. 4C, a pictorial representation of a variation of the "read-after-write" head arrangement of FIG. 4B is shown. For this example, section 400c includes a read/write head assembly 402c and a magnetic tape 404. Magnetic tape 404 includes four bands of tracks.

Exemplary read/write head assembly 402c includes four read/write heads 406c, 408c, 409c and 410c. Again, the structure and arrangement shown are for illustrative purposes only and not intended as an architectural limitation for the present invention.

Referring again to the above-described channels per head relationship, M/N, in order to provide 32 data channels ("M"=32) to transfer data between read/write head assembly 402c and magnetic tape drive 400c, each of the four read/write heads 406c, 408c, 409c, 410c ("N"=4) can be associated with (and electronically coupled to) 8 data channels. As such, in accordance with the present invention, the channels per head relationship, M/N, of 8 channels per head, can be realized with the exemplary configuration of read/write head 408c of sub-assembly 405c shown in FIG. 4C.

As illustrated by the exploded view of read/write head 408c as an example, each read/write head 406c, 408c, 409c, 410c can include eight write/read/write elements (e.g., 416a-416h) in a read-after-write arrangement. Each of the eight write/read/write elements 416a-416h may be associated with (and coupled to) one data channel. Therefore, for this example, the four read/write heads 406c, 408c, 409c, 410c can be configured to provide 32 data channels for transferring data between read/write head assembly 402c and magnetic tape drive 400c.

Figure 5A:
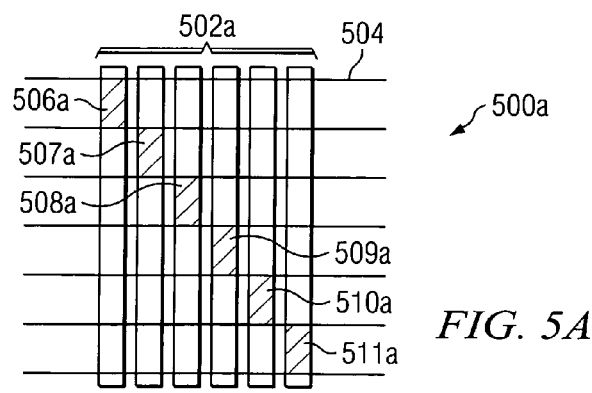
FIGS. 5A-5B are related diagrams illustrating various read/write head and data channel arrangements for magnetic storage media applications that may be used to implement a preferred embodiment of the present invention.
Figure 5B:
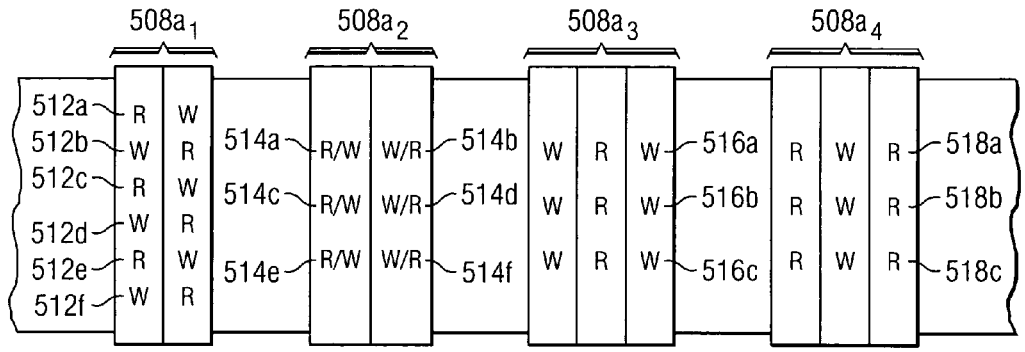

FIGS. 5A-5B are related diagrams illustrating various read/write head and data channel arrangements for magnetic storage media applications that may be used to implement a preferred embodiment of the present invention. Referring to the exemplary embodiment shown in FIG. 5A, a pictorial representation of a section 500a of a magnetic tape drive is shown. For this example, section 500a includes a read/write head assembly 502a and a magnetic tape 504. In this example, the magnetic tape 504 includes six bands of tracks. Again, similar to the arrangement shown in FIG. 2, each read/write head of read/write head assembly 502a can be positioned in a vertical direction, and magnetic tape 504 can be moved in a horizontal direction and in close proximity to read/write head assembly 502a.

Exemplary read/write head assembly 502a includes six read/write heads 506a-511a. Referring to the channels per head relationship, M/N, for this example, in order to provide 72 data channels ("M"=72) to transfer data between read/write head assembly 502a and magnetic tape drive 500a, each of the six read/write heads 506a-511a (e.g., "N"=6) can be associated with (and electronically coupled to) 12 data channels. As such, in accordance with the present invention, the channels per head relationship, M/N, of 12 channels per head, can be realized with anyone of the exemplary configurations of read/write heads $508a_1$-$508a_4$ shown in FIG. 5B.

For example, as illustrated by read/write head 508a, in FIG. 5B, each read/write head 506a-511a can include 12 read and write or write and read elements (e.g., 512a-512f). Also, each of the 12 read and write or write and read elements 512a-512f may be associated with (and coupled to) one data channel. Therefore, for this example, the six read/write heads 506a-511a can be configured to provide 72 data channels for transferring data between read/write head assembly 502a and magnetic tape drive 500a.

Similarly, as illustrated by exemplary read/write head $508a_2$ in FIG. 5B, each read/write head 506a-511a can include 12 read and write or write and read elements (e.g., 514a-514f). Also, for this example, each of the 12 read and write or write and read elements 514a-514f may be associated with (and coupled to) one data channel. Therefore, for this example, the six read/write heads 506a-511a can be configured to provide 72 data channels for transferring data between read/write head assembly 502a and magnetic tape drive 500a.

Additionally, other read/write head configurations may be used to implement the present invention. For example, each of read/write heads 506a-511a in FIG. 5A can include at least one of the read/write head arrangements $508a_3$ or $508a_4$ in FIG. 5B. For example, each read/write head 506a-511a can include 3 sets of read-after-write elements, such as write/read/write sets 516a-516c of read/write head $508a_3$, or read/write/read sets 518a-518c of read/write head $508a_4$. For these examples, each of the 3 sets of write/read/write elements 516a-516c or read/write/read elements 518a-518c may be associated with (and coupled to) three data channels. Therefore, for these examples, the six read/write heads 506a-511a can be configured to provide 54 data channels for transferring data between read/write head assembly 502a and magnetic tape drive 500a.

Figure 6:
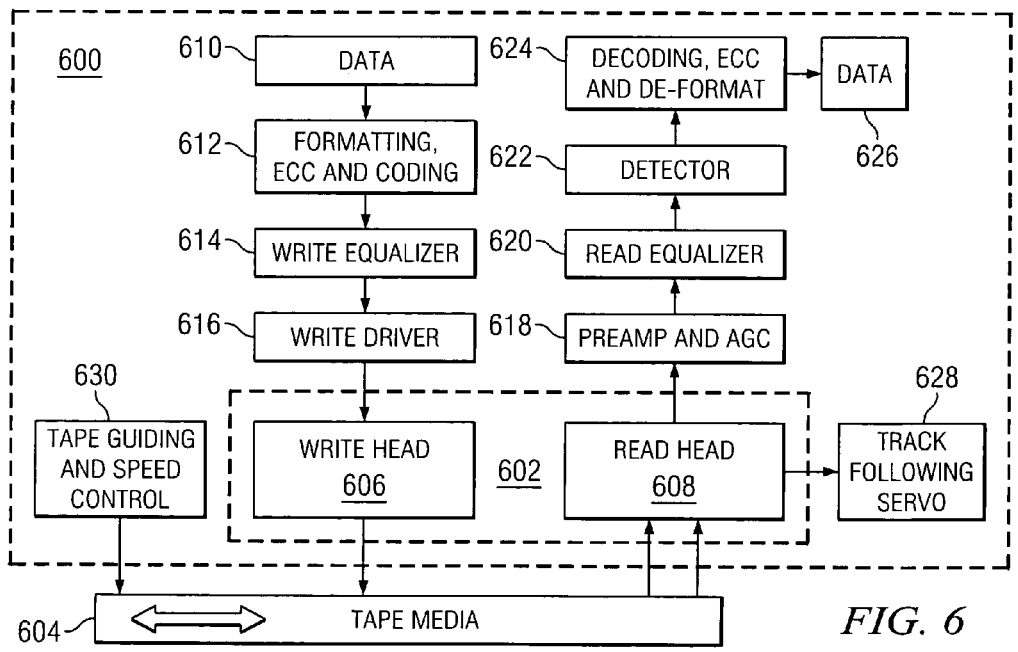
FIG. 6 is a block diagram of a tape recording system illustrating an example read/write head assembly that may be used to implement a preferred embodiment of the present invention.

FIG. 6 is a block diagram of a tape recording system illustrating an example read/write head assembly that may be used to implement a preferred embodiment of the present invention. For this example, read/write head assembly 600 is arranged in close proximity to a storage media surface of magnetic tape 604, so that the read/write head assembly 600 can transfer data between magnetic tape 604 and a magnetic tape drive (not shown). As such, exemplary read/write head assembly 600 includes read/write head 602. As illustrated by this example, read/write head 602 can include a write element 606 and a read element 608. Write element 606 can be associated with (and electronically connected to) a first data channel for transferring data from the magnetic tape drive to magnetic tape 604. Read element 608 can be associated with (and electronically connected to) a second data channel for transferring data from magnetic tape 604 to the magnetic tape drive.

Notably, the exemplary structure, number and arrangement of write and read elements 606, 608 and data channels are shown in FIG. 6 and described herein for illustrative purposes only and not intended as an architectural limitation for the present invention. For example, read/write head 602 can include any one of the above-described read/write head and channel arrangements shown in FIGS. 2-5B. Also, for example, each write element and read element 606, 608 in FIG. 6 can be associated with a respective data channel (one data channel for writing, and one data channel for reading). Alternatively, the paired combination of a write element 606 and read element 608 can be associated with one data channel (one data channel for writing/reading).

For clarity, read/write head assembly 600 and magnetic tape 604 are oriented differently in FIG. 6 than in FIGS. 2-5B. For example, a side view of magnetic tape 604 is shown in FIG. 6, while top surface views of the magnetic tapes in FIGS. 2-5B are shown. Thus, in FIG. 6, magnetic tape 604 can be depicted as movable in a horizontal direction with respect to read/write head assembly 600. Similarly, a side view of read/write head assembly 600 is shown in FIG. 6. However, in this case, read/write head assembly 600 can be depicted as movable in a direction perpendicular to that of magnetic tape 604 (i.e., into and out of FIG. 6).

For this exemplary embodiment, write element 606 creates a magnetic field to write or store data on the magnetic media of tape 604. Data to be written onto magnetic tape 604 is coupled from the magnetic tape drive to an input 610 of a data channel. The input write data is coupled to an encoding unit 612, which functions primarily to format the input data according to a prescribed protocol for the magnetic storage media involved, perform Error Correction Coding (ECC) to verify the accuracy and validity of the input data received, and encode the valid write data into a prescribed digital sequence. The valid, coded write data can be coupled to a write equalizer unit 614, which functions primarily to reduce distortion and compensate for attenuation of the coded data signal. The equalized data is then coupled to a write driver unit 616, which provides electrical current to "drive" or activate the write head element 606, which, in turn, writes the data onto the storage media of magnetic tape 604.

Additionally, for this exemplary embodiment, read head element 608 senses or reads data stored in magnetic form on the magnetic media of tape 604. The data signal is read from magnetic tape 604 in the form of a modulated signal and coupled to a preamplifier and Automatic Gain Control (AGC) unit 618 of a data channel. The current signal generated in read head element 608 by the sensed magnetic data is minuscule, so a primary function of preamplifier and AGC unit 618 is to amplify the sensed data signal, and control the gain level to compensate for variations in the magnitude of the amplified signal. The amplified read data is coupled to a read equalizer unit 620, which functions primarily to reduce distortion of the read data signal and compensate for signal attenuation. The equalized read data signal is then coupled to a detector unit 622, which functions primarily to detect or recover the read data of interest from the signal modulation envelope, carrier or sequence. The detected read data is then coupled to a decoding unit 624, which functions primarily to decode the read data from the prescribed sequence, perform ECC to verify the accuracy and validity of the decoded read data, and remove the formatting information from the data. The resulting data is coupled to an output 626 of the data channel involved, and to the magnetic tape drive.

Exemplary read/write head assembly 600 also includes track following servo unit 628, which functions primarily to analyze the magnitude and phase of the read data signal from read head element 608. The magnitude and phase of the read data signal can be used to determine the vertical alignment of the read head element 608 (and write head element 606) with respect to a particular track or band on the magnetic storage media of tape 604. Track following servo unit 628 can use the magnitude and phase of the read data signal in a feedback loop of a servo unit in order to position and align read/write head 602 with respect to the track or band on magnetic tape 604. A tape guiding and speed control unit 630 can control the movement of the magnetic tape 604. Notably, in accordance with the present invention, read/write head assembly 600 can be arranged to provide the above-described data channel per head/track relationship, M/N, which requires only one (fine) read/write head actuation or positioning mode.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data storage system, comprising:
    a plurality of read/write heads, each read/write head of said plurality of read/write heads having a plurality of read/write elements;
    a plurality of data channels, a subset of said plurality of data channels coupled to a read/write head of said plurality of read/write heads; and
    a storage medium, said storage medium including a plurality of storage bands, wherein each read/write head is uniquely associated with a single storage band such that the read/write heads are alignable with a single mode of operation, and each read/write element is associated with a corresponding one of said plurality of data channels and operable to read and write data from or to corresponding tracks of a corresponding storage band;
    wherein said plurality of read/write heads comprises at least one read/write head having a read/write element configured for read after write operation as the storage medium travels in a first direction and at least one read/write head having a write/read element configured for read after write operation as the storage medium travels in a second direction opposite the first direction.

2. A data storage system comprising:
    a plurality of read/write heads each associated with a corresponding one of a plurality of storage bands extending across a magnetic storage medium wherein each of the plurality of read/write heads is displaced along a direction of travel of the magnetic storage medium relative to an adjacent read/write head and wherein each of the plurality of read/write heads is coupled to at least one of a plurality of data channels;

wherein at least one of the plurality of read/write heads comprises a read/write element configured for read after write operation as the magnetic storage medium travels in a first direction and at least one of the plurality of read/write heads comprises a write/read element configured for read after write operation as the magnetic storage medium travels in a direction opposite the first direction.

* * * * *